(12) United States Patent
Knoedgen

(10) Patent No.: US 9,331,592 B2
(45) Date of Patent: May 3, 2016

(54) TOPOLOGY DETECTION

(71) Applicant: Dialog Semiconductor GmbH, Kirchheim/Teck-Nabern (DE)

(72) Inventor: Horst Knoedgen, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 202 days.

(21) Appl. No.: 14/166,381

(22) Filed: Jan. 28, 2014

(65) Prior Publication Data

US 2014/0268921 A1  Sep. 18, 2014

(30) Foreign Application Priority Data

Mar. 12, 2013  (EP) ..................... 13158854

(51) Int. Cl.
  *H02M 3/335*  (2006.01)
(52) U.S. Cl.
  CPC ...... *H02M 3/33569* (2013.01); *H02M 3/33515* (2013.01)
(58) Field of Classification Search
  CPC .................... H02M 3/33507; H02M 3/33592; H02M 3/33523; H02M 7/003; Y02B 70/126; H05B 41/2928; H05B 41/2822; H05B 41/232; H05B 41/2827
  USPC .............. 363/21.12–21.18, 89, 147; 315/246–287
  See application file for complete search history.

(56) References Cited

U.S. PATENT DOCUMENTS

| 6,049,471 | A | 4/2000 | Korcharz et al. | |
| 7,667,992 | B2* | 2/2010 | Wong ................. | H02M 1/4225 363/147 |
| 8,704,451 | B2* | 4/2014 | Lu ..................... | H05B 33/0824 315/200 R |
| 2014/0140109 | A1* | 5/2014 | Valley ................ | H02M 1/4258 363/21.17 |

OTHER PUBLICATIONS

European Search Report 13158854.3-1809 Mailed: Dec. 6, 2013, Dialog Semiconductor GmbH.

* cited by examiner

*Primary Examiner* — Nguyen Tran
(74) *Attorney, Agent, or Firm* — Saile Ackerman LLC; Stephen B. Ackerman

(57) ABSTRACT

Driver circuits comprise power converters detecting automatically a topology used by the driver circuits. A controller controls a plurality of different types of power converters in accordance to a corresponding plurality of different operation modes. The controller comprises a measurement pin coupled to a first topology resistor of a first power converter of a type from the plurality of different types. The different types of power converters comprise topology resistors of corresponding different resistor values. The controller senses a voltage at the measurement pin wherein the voltage at the measurement pin is indicative of a voltage drop at the first topology resistor. Furthermore, the controller determines a type of the first power converter based on the sensed voltage, and selects an operation mode for controlling the first power converter.

28 Claims, 3 Drawing Sheets

TOPOLOGY DETECTION

TECHNICAL FIELD

The present document relates to driver circuits comprising power converters, such as switched-mode power converters. In particular, the present document relates to the automatic detection of a topology used by the driver circuits.

BACKGROUND

Power converters may comprise controller circuits which are configured to control the components (e.g. the one or more power switches) of the power converters. It may be desirable to be able to use the controller circuits for different topologies of power converters. The present document describes a method and system for enabling the use of controller circuits in conjunction with different topologies of power converters.

SUMMARY OF THE DISCLOSURE

A principal object of the present disclosure is to use controller circuits configured to control the components of power converters for different topologies of the power converters.

A further object of the disclosure is to regulate a plurality of different types of power converters in a different manner.

A further object of the disclosure is to depend on the number of power switches to be controlled for a particular type of power converter and/or on the regulation scheme to be used for a particular type of power converter.

A further object of the disclosure is to use resistor values of the topology resistors to indicate the type of the first power converter (and vice versa).

A further object of the disclosure is to determine the type of a power converter which is to be operated by the controller by a voltage drop at a topology resistor depending on the resistor value of the topology resistor.

In accordance with the objects of this disclosure a controller configured to control a plurality of different types of power converters in accordance to a corresponding plurality of different operation modes has been achieved. The controller comprises a measurement pin configured to be coupled to a first topology resistor of a first power converter of a type from the plurality of different types of power converters; wherein the plurality of different types of power converters comprise topology resistors at a corresponding plurality of different resistor values. Furthermore the controller is configured to sense a voltage at the measurement pin; wherein the voltage at the measurement pin is indicative of a voltage drop at the first topology resistor, to determine a type of the first power converter based on the sensed voltage, and to select an operation mode for controlling the first power converter, based on the determined type of the first power converter.

In accordance with the objects of this disclosure a method for determining a topology of a power converter to be controlled by a controller has been achieved. The method disclosed firstly comprises: providing a driver circuit comprising the controller configured to control a plurality of different types of power converters, assigning a plurality of different topology resistor values to a plurality of different power converter topologies, and coupling a first power converter having a first topology of the plurality of different topologies to the controller via a first topology resistor having a corresponding first one of the plurality of different topology resistor values. Furthermore the method comprises determining a voltage drop at the first topology resistor, and determining the topology of the first power converter based on the determined voltage drop.

According to an aspect, a controller is described which is configured to control a plurality of different types of power converters in accordance to a corresponding plurality of different operation modes. By way of example, the different types of power converters may comprise a different number of power switches (e.g. metal oxide semiconductor field effect transistors) and/or the plurality of different types of power converters may be regulated in a different manner. As such, the operation mode may depend on the number of power switches to be controlled for a particular type of power converter and/or on the regulation scheme to be used for a particular type of power converter.

The controller may comprise a measurement pin configured to be coupled to a first topology resistor of a first power converter. The first power converter may be of a type from the plurality of different types of power converters. The plurality of different types of power converters may comprise topology resistors at a corresponding plurality of different resistor values. As such, the resistor value of the first topology resistor may be indicative of the type of the first power converter (and vice versa). The first topology resistor may be coupled to the measurement pin of the controller, such that the controller may determine the resistor value of the first topology resistor based on a measurement signal (e.g. a voltage level) sensed at the measurement pin of the controller. As such, the controller may be enabled to automatically determine the type of the first power converter and to automatically set the appropriate operation mode for operating and/or controlling the first power converter in accordance to the type of the first power converter.

In particular, the controller may be configured to sense a measurement signal (e.g. a voltage) at the measurement pin. The measurement signal at the measurement pin may be indicative of a voltage drop at the first topology resistor. The voltage drop at the first topology resistor depends on the resistor value of the first topology resistor. Hence, the voltage drop at the first topology resistor is indicative of the resistor value of the first topology resistor. The resistor value of the first topology resistor is indicative of the type of the first power converter, and by consequence, the controller is enabled to determine the type of the first power converter which is to be operated by the controller, based on the determined type of the first power converter.

As such, the controller may be configured to determine a type of the first power converter based on the sensed measurement signal. By way of example, the controller may comprise a memory unit configured to store a plurality of different pre-determined measurement signal values (e.g. different pre-determined voltage values). The plurality of different pre-determined measurement signal values (e.g. voltage values) may correspond to the plurality of different types of power converters. In particular, the pre-determined measurement signal values may be indicative of the measurement signal which should be sensed at the measurement pin if the power converter of the corresponding type (and the topology resistor of the corresponding resistor value) is coupled to the measurement pin. The controller may be configured to compare the sensed measurement signal (e.g. sensed voltage) with the plurality of different pre-determined measurement signal values (e.g. voltage values) to determine the type of the first power converter.

The controller may then be configured to select an operation mode for controlling the first power converter, based on the determined type of the first power converter. By doing this, the controller may be pre-configured to control various different types of power converters. As a consequence, the number of controller types can be reduced, thereby reducing the cost of driver circuits comprising the different types of power converters. Furthermore, the verification of the type of the power converter ensures that the controller operates the power converter in a safe operation mode, thereby reducing the risk of over stress of the power converter.

The first topology resistor may be part of a voltage divider and a voltage across the voltage divider may correspond to a voltage level which is known to the controller. By way of example, the voltage level across the voltage divider may correspond to an input voltage to the power converter. The input voltage to the power converter may correspond to a rectified version of a mains voltage provided by a mains supply (e.g. at 230V or 110V). A mid-point of the voltage divider may be coupled to the measurement pin of the controller, such that the measurement signal at the measurement pin may correspond to a fraction of the voltage level known to the controller. The sensed fraction of the voltage level depends on the resistor value of the first topology resistor, and by consequence, the measurement signal is indicative of the resistor value of the first topology resistor.

More specifically, the voltage divider may be coupled to an AC mains supply and the first topology resistor may be coupled to a first conductor of the AC mains supply. A second topology resistor may be coupled to a different second conductor of the AC mains supply at one side, and to the mid-point of the voltage divider at the other side. The second topology resistor may be part of the first power converter and may be used to provide a further indication regarding the type of the first power converter. In particular, the first and second topology resistors may be coupled to the AC mains voltage, such that in a first half-wave of the AC mains voltage the first topology resistor provides a measurement signal to the controller and such that in a second half-wave of the AC mains voltage the second topology resistor provides a measurement signal to the controller. By consequence, the combination of the first and second topology resistors (i.e. the combination of the measurement signals during the first and second half-waves of the AC mains voltage) may be used as indications regarding the type of power converters. This allows increasing the number of different types of power converters which may be distinguished and determined by the controller.

The voltage divider may further comprise a low side resistor which is coupled to the mid-point of the voltage divider (at one side of the low side resistor) and to ground (on the other side of the voltage), such that the first and second topology resistors, on one side of the mid-point, and the low side resistor, on the other side of the mid-point, form the voltage divider. Furthermore, at least some of the plurality of different types of power converters may comprise second topology resistors at different resistor values. As indicated above, this allows a greater number of different types of power converters to be determined. The resistor value of the low side resistor may be fixed and/or identical for the different types of power converters. Alternatively or in addition, the resistor value of the low side resistor may be known to the controller.

In an alternative example, the voltage divider may comprise a high side resistor coupled at one side to an input voltage of the first power converter, and at the other side to the mid-point of the voltage divider. The first topology resistor may be coupled at one side to the mid-point of the voltage divider and at the other side to ground. As such, the voltage divider may be configured to divide the input voltage of the first power converter, with the voltage across the first topology resistor being indicative of the resistor value of the first topology resistor. The resistor value of the high side resistor may be fixed and/or identical for the different types of power converters. Alternatively or in addition, the resistor value of the high side resistor may be known to the controller.

The first power converter may comprise a power switch arranged in series with a shunt resistor coupled at one side to ground. The other side of the shunt resistor may be coupled to a drain or source of the power switch. The shunt resistor may be used to provide a measurement signal which is indicative of the current through the power switch. Typically, the shunt resistor has a resistor value which is significantly smaller than the resistor value of the first topology resistor, such that a voltage drop across the first topology resistor is significantly larger than a voltage drop across the shunt resistor (e.g. by a factor of 100 or 1000 or more).

The other side of the shunt resistor (i.e. the side towards the drain or source of the power switch) may be coupled to the measurement pin via the first topology resistor. As such, the first topology resistor may be coupled to ground via the shunt resistor. The controller may be configured to alternate the power switch between an off-state and an on-state. Furthermore, the controller may be configured to measure a first measurement signal at the measurement pin, when the power switch is in on-state, and a second measurement signal at the measurement pin, when the power switch is in off-state. The first measurement signal may be indicative of the current through the power switch and may be used to control a time instant for the transition of the on-state to the off-state of the power switch. The second measurement signal may be indicative of a voltage drop at the first topology resistor, and may therefore be used to determine the type of the first power converter. As such, the measurement pin of the controller may be used for purposes which are in addition to the determination of the type of the first power converter. This means that the number of pins of the controller may be reduced. In particular, this means that the controller does not require an additional pin for determining the type of the first power converter, but may re-use a pin which is already used for the operation of the first power converter.

The controller may comprise a current source configured to provide a pre-determined current to the measurement pin. The current source may be coupled and decoupled from the measurement pin using an internal switch of the controller. The measurement signal at the measurement pin may correspond to or may be indicative of the voltage drop at the first topology resistor. The voltage drop at the first topology resistor may be dependent on the pre-determined current. In particular, the first topology resistor may be coupled to the measurement pin, such that a current through the first topology resistor corresponds to the pre-determined current.

As indicated above, the first power converter may be or may comprise a switched-mode power converter which comprises a power switch. The controller may be configured to generate a control signal for alternating the power switch between the off-state and the on-state. The control signal may correspond to a gate voltage applied to a gate of the power switch. The control signal may be generated by the controller based on the type of the first power converter. Example types of the first power converter comprise a buck converter, a SEPIC (Single-Ended Primary-Inductor Converter) converter, a flyback converter, a LLC converter and/or a boost converter.

Alternatively or in addition, the controller may comprise a control pin configured to be coupled to a gate of a power switch (which may be referred to as a first power switch) of at least one of the plurality of different types of power converters. The controller may be configured to switch the power switch between an on-state and an off-state using a control signal which is passed from the controller to the gate of the power switch via the control pin.

For topology detection, the controller may be configured to provide a gate current at the control pin. If the gate of the power switch is coupled to the control pin, then the gate current charges a gate capacitor of the power switch. This typically leads to an increase of the voltage at the gate of the power switch. The speed of increase of the voltage depends on the size of the gate capacitance. As such, the speed (or time constant) of the increase of the voltage at the control pin may provide an indication of the type of power switch coupled to the control pin. On the other hand, if no power switch is coupled to the control pin, the voltage at the control pin will not increase.

The controller may be configured to sense the voltage at the control pin. Furthermore, the controller may be configured to determine the type of the power converter which is coupled to the control pin based on the voltage at the control pin. By way of example, if subject to providing the gate current, the voltage remains below a pre-determined threshold voltage at the expiration of a pre-determined time interval, the controller may conclude that no power switch is coupled to the control pin. This may indicate to the controller that the power converter which is to be controlled by the controller is a single-stage power converter. On the other hand, if subject to providing the gate current, the voltage exceeds the pre-determined threshold voltage at the expiration of the pre-determined time interval, the controller may conclude that a power switch is coupled to the control pin. This may indicate to the controller that the power converter which is to be controlled by the controller is a multi-stage power converter.

The controller may make use of a plurality of pre-determined threshold voltages and/or a plurality of pre-determined time-intervals, in order to be able to distinguish a plurality of different gate capacitance values. Different gate capacitance values may be indicative of different types of power switches used in different types of power converters. As such, the topology of the power converter and/or of the driver circuit may be determined based on different gate capacitance values used for different power switches of different power converter and/or driver circuit topologies.

The controller may be configured to determine the type of the first power converter based on the sensed voltage at the control pin. Furthermore, the controller may be configured to determine the type of the first power converter based on the sensed voltage at the control pin in combination with the sensed voltage at the measurement pin. As such, various different properties of the power converters and/or driver circuits may be used in combination to determine the type of the first power converter. By doing this, the number of different types of power converters which may be distinguished may be increased.

According to an aspect, a controller configured to control a plurality of different types of power converters in accordance to a corresponding plurality of different operation modes is described. The controller may comprise a control pin configured to be coupled to a gate of a first power switch of a first power converter of a type from the plurality of different types of power converters. The plurality of different types of power converters may comprise power switches with gate capacitances at a corresponding plurality of different gate capacitance values. The controller may be configured to provide a gate current at the control pin. Furthermore, the controller may be configured to sense a voltage at the control pin. The voltage at the control pin may be indicative of a first gate capacitance value of the gate capacitance of the first power switch. The controller may be configured to determine a type of the first power converter based on the sensed voltage. In particular, the controller may be configured to determine the gate capacitance value (and the corresponding type of the power converter) based on the evolution of the sensed voltage along the time line (e.g. using pre-determined threshold voltages and pre-determined time intervals, as outlined above). Furthermore, the controller may be configured to select an operation mode for controlling the first power converter, based on the determined type of the first power converter.

The controller may have access to configuration or topology data stored on a storage unit of the power converter or driver circuit (e.g. a one-time programmable storage unit, OTP). As such, the controller may have an expectation regarding the type of power converter and/or driver circuit which is to be controlled. The controller may be configured to compare the determined type of the first power converter with a type stored in the storage unit. If the determined type of the first power converter differs from the stored type, the controller may be configured to generate an error message.

The different types of the power converters may comprise different resistor values and/or different gate capacitance values in order to inform the controller about different operation modes to be used. By way of example, different ramp up times of the illumination of a light source driven by a driver circuit may be associated with different types of power converters (having e.g. different resistor values and/or different gate capacitance values). The controller may be configured to determine the type of the power converter which is to be controlled. Furthermore, the controller may be configured to select the appropriate operation mode. The selected operation mode may provide the ramp up time associated with the determined type of the power converter.

According to another aspect, a driver circuit is described which is configured to provide electrical energy to a load (e.g. a light source such as an LED array). The electrical energy may be derived from a mains supply. The driver circuit may comprise a first power converter configured to convert electrical energy at an input voltage of the first power converter into electrical energy at an output voltage of the first power converter. The first power converter may be of a type from a plurality of different types of power converters. The plurality of different types of power converters may comprise topology resistors at a corresponding plurality of different resistor values.

Furthermore, the driver circuit may comprise a controller according to any of the aspects and features described in the present document. The controller may be configured to determine the type of the first power converter based on the topology resistor of the first power converter. Furthermore, the controller may be configured to operate the first power converter based on (or in accordance to) the determined type of the first power converter.

According to a further aspect, a light bulb assembly is described. The light bulb assembly may comprise an electrical connection module configured to electrically connect to a mains power supply, thereby providing electrical energy at the input voltage. Furthermore, the light bulb assembly may comprise a driver circuit as described in the present document. The driver circuit may be configured to provide electrical energy at the drive voltage derived from the electrical energy at the input voltage. Furthermore, the light bulb assembly comprises a light source (e.g. a series of LEDs or OLEDs) configured to provide light using the electrical energy at the drive voltage.

According to another aspect, a method for determining a topology of a power converter is described. The power converter may be controlled by a controller. The method may comprise assigning a plurality of different topology resistor values to a plurality of different power converter topologies (also referred to as different types of power converters). The assigning may be such that a topology resistor value uniquely identifies a corresponding power converter topology. In other words, there may be a one-to-one correspondence between a topology resistor value and a power converter topology.

The method may further comprise coupling a first power converter having a first topology of the plurality of different topologies to the controller via a first topology resistor having a corresponding first one of the plurality of different topology resistor values. Furthermore, the method may comprise determining a measurement signal which may be indicative of a voltage drop at the first topology resistor. The topology of the first power converter may be determined based on the measurement signal, e.g. based on the determined voltage drop.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
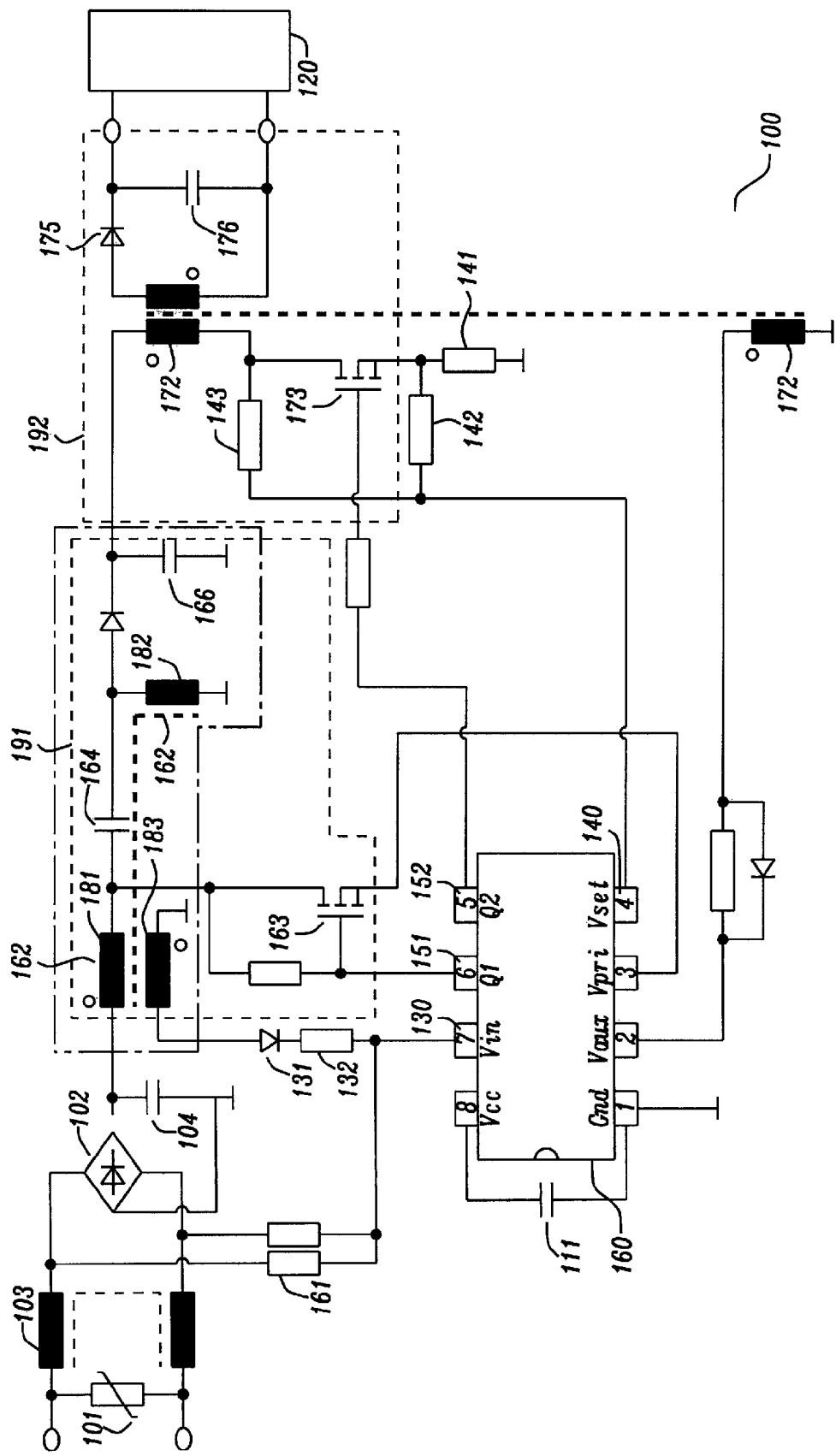
FIG. 1 shows a circuit diagram of an example driver circuit comprising a two-stage switched-mode power converter.

FIG. 1 illustrates an example circuit diagram of a driver circuit 100 for an LED (light emitting diode) array 120. The driver circuit 100 may be used e.g. in a retrofit light bulb assembly. The driver circuit 100 comprises a rectifier 102 in combination with EMI (electromagnetic interference) filter components 103, 104, which are configured to provide a DC input voltage from a mains supply 101. Furthermore, the driver circuit 100 comprises a controller 160 which may be implemented as an integrated circuit (IC). The supply voltage for the controller 160 may be maintained using a supply voltage capacitor 111. The controller 160 may comprise a startup and input voltage sensing pin 130, which is coupled to the (non-rectified) input voltage using startup resistors 161. The particular arrangement of the startup resistors 161 ensures that the voltage at the startup and input voltage sensing pin 130 is always positive.

The driver circuit 100 of FIG. 1 comprises a dual-stage power converter. The controller 160 provides at least two output pins 151, 152 for providing respective pulse width modulated control signals to the two power switches 163, 173 (which may be implemented as transistors, e.g. as metal oxide semiconductor field effect transistors, MOSFETs) of the two converter stages 191, 192. The driver circuit 100 makes use of a dual stage SEPIC/Flyback converter, wherein the first converter (a single ended primary inductance converter (SEPIC) converter) 191 comprises the components 162, 163, 164, 165, 166 and wherein the second converter (a flyback converter) 192 comprises the components 172, 173, 175, 176. In the illustrated example, the second converter stage provides for the SELV (Separated or safety extra-low voltage) requirements.

As indicated above, the controller 160 may comprise the startup and input voltage sensing pin 130 which is configured to provide an initial charge to the supply voltage capacitor 111 upon startup of the driver circuit 100, thereby allowing the controller 160 to start operation. Alternatively or in addition, the startup and input voltage sensing pint 130 may be used to sense the input voltage provided by the mains supply 101. This may be used to sense events encoded in the input voltage (e.g. encoded in the mains supply). The controller 160 may be configured to control an illumination state of the LED array 120 based on a detected event.

As indicated above, the first converter stage 191 of the driver circuit 100 comprises a SEPIC (Single-ended primary-inductor converter) comprising a SEPIC transformer 162. The transformer 162 comprises a primary winding 181 and a secondary winding 182 which form the SEPIC converter structure. Furthermore, the transformer 162 may comprise an auxiliary winding 183 which may be used for measurement purposes. In particular, the auxiliary winding 183 may be used to detect the zero crossing of the inductor current through the primary winding 181, when the power switch 163 of the SEPIC is in off-state. The zero crossing of the inductor current typically corresponds to the time instant when no more energy is stored in the primary winding 181, and is often referred to as free-wheeling. The detection of the zero crossing of the inductor current (i.e. the detection of free-wheeling) is beneficial, as it allows the power switch 163 to be switched to the on-state, at a time instant when the inductor current is substantially zero. As a result, the power losses of the SEPIC can be reduced and the lifetime of the power switch 163 can be increased.

The startup and input voltage sensing pin 130 may be used to enable the controller 160 to measure the zero crossing of the inductor current of the SEPIC. For this purpose, the auxiliary winding 183 of the SEPIC transformer 162 may be coupled to the pin 130 via a diode 131 and a resistor 132, thereby overlaying the input voltage measurement signal (provided via the startup resistors 161) and the inductor current measurement signal (provided via the auxiliary winding 183 of the SEPIC transformer 162). The diode 131 may be used to decouple the auxiliary winding 183 from the startup resistors 161 at time instants when the power switch 163 is closed (and energy is stored in the transformer 162). The resistor 132 may be used to prevent current peaks. The controller 160 may be configured to separate the overlaid measurement signals received via pin 130. The separation of the overlaid measurement signals may be performed using digital signal processing techniques. Alternatively or in addition, the separation of the overlaid measurements signals may be performed using appropriate circuitry and/or temporal separation. By way of example, a first measurement signal may be measured during a first time period (e.g. when the power switch 163 is closed) and a second measurement signal may be measured during a subsequent second time period (e.g. when the power switch 163 is open).

As outlined in the context of FIG. 1, the driver circuit 100 may comprise a plurality of converter stages, e.g. a boost or a SEPIC converter followed by a flyback converter. For the flyback converter 192 of FIG. 1, the input voltage Vin of the flyback converter 192, including free-wheeling, may be measured together with the current through the flyback converter power switch 173 at the shunt resistor 141. If the power switch 173 is switched off, the input voltage Vin to the flyback converter 192 can be measured at the pin 140 via the resistor divider formed by the resistors 143, 142. The shunt resistor 141 may have a relatively low resistance and may therefore not have a significant influence for the measurement of the input voltage. Free-wheeling may be detected, by detecting a fast change of the voltage sensed at the pin 140. In other words, when the power switch 173 of the flyback converter is in off-state, the measurement signal at the pin 140 is an indication of the bus voltage across the transformer 172, and the voltage divider 143, 142. As long as there is a current flowing through the transformer 172, there is a voltage drop across the primary winding of the transformer 172. However, upon zero crossing of the current, the voltage drops to zero, thereby causing a discontinuity of the voltage at the pin 140. This discontinuity can be detected within the controller 160, thereby detecting free-wheeling.

As such, the controller 160 may be configured to receive various measurement signals from the respective power converter stages 191, 192. Furthermore, the controller 160 may be configured to generate control signals for the respective power switches 163, 173 of the power converter stages 191, 192, based on the received measurement signals. The controller 160 may make use of different control algorithms for generating the control signals based on the received measurement signals. The control algorithms typically depend on the topology of the power converter stage 191, 192 which is to be controlled.

The controller 160 may be configured to control different types and/or different topologies of power converters 191, 192. The use of a wrong control algorithm and/or the generation of an erroneous control signal may damage the driver circuit 100 and/or the respective power converters 191, 192. In the present document a method and a system are described which enable the automatic detection of the topology of the one or more power converters 191, 192 which are coupled to the controller 160. As a consequence, the controller 160 may be configured to automatically detect the topology of the power converter 191, 192 which the controller 160 is to control. Based on the automatically detected topology, the controller 160 may select an appropriate control algorithm and/or an appropriate regulation scheme for generating the control signal for the power switch 163, 173 of the detected power converter 191, 192. Hence, the controller 160 may be used in conjunction with various different topologies of power converters 191, 192, thereby reducing the overall cost of the driver circuit 100.

In other words, the automatic detection of the topology of the power converter enables the controller 160 to operate with different topologies (e.g. single stage topology or dual stage topology). The controller 160 may be configured to detect the external system, circuits and topologies. The automatic detection of the external topology protects the overall system against critical operation conditions by a wrong programming of the controller 160 for a given topology. In particular, the controller 160 may be configured to first determine the topology of the power converter which is coupled to the controller 160 and to then select the appropriate control algorithm/regulation scheme for the identified power converter.

The automatic detection of the topology may be based on the measurement of external components of the system (e.g. the power converter) coupled to the controller 160. For this purpose, the controller 160 may be configured to initially operate the system in a default operation mode. The default operation mode may allow the controller 160 to make the necessary measurements to determine the topology of the external system. At the same time, the default operation mode may ensure a safe operation of the external system.

Once the topology of the system coupled to the controller 160 is detected, the controller 160 may be configured to operate the system based on the detected topology. Furthermore, selected functions of the controller 160 may be enabled/disabled. In addition, the controller and/or the external components may be protected from over stress and critical operation conditions. Furthermore, multi topologies and/or different operation conditions (e.g. different operation frequencies) may be used, depending on the detected topology.

The controller 160 may be configured to automatically detect the topology of an external power converter by measuring the value of one or more external components of the external power converter. Furthermore, the controller 160 may be configured to compare the measured value of the one or more external components with a pre-determined list of values, wherein the pre-determined values of the pre-determined list correspond to pre-determined topologies. As such, a match between the measured value and a pre-determined value from the pre-determined list of values may inform the controller 160 about which one of the pre-determined topologies of external power converters is coupled to the controller 160.

Figure 3:
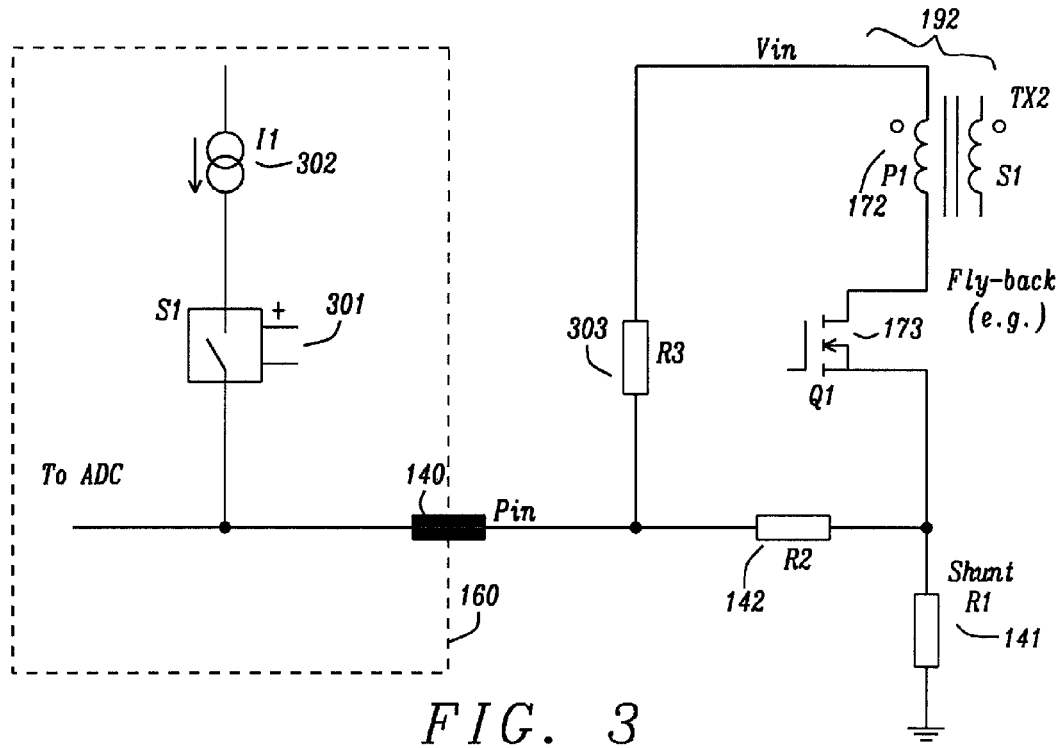
FIG. 3 shows a block diagram of an example system for detecting the topology of a power converter.

By way of example, the external component may comprise an external resistor. Different topologies of power converters may use different values for the external resistor. The controller 160 may be configured to measure the value of the external resistor or a measurement signal which depends on the value of the external resistor. Furthermore, the controller 160 may be configured to determine the topology of the power converter based on the measured value. This is illustrated in FIG. 3 where the flyback converter 192 in conjunction with the controller 160 of FIG. 1 is shown. The Fly-back converter 192 comprises a transformer TX2 172, a primary winding P1, and a secondary winding S1 The power switch 173 of the flyback converter 192 is arranged in series with the shunt resistor R1 141 which is coupled to the pin 140 of the controller 160 via a resistor R2 142 (referred to herein as the topology resistor). Typically, the resistor R2 142 is used for protection purposes, wherein the exact value of the resistor R2 142 is usually not important. In the present document, it is proposed to use the exact value of the resistor R2 142 to indicate the topology of the power converter 192 to the controller 160. In particular, the topology resistor 142 may take on different values for different topologies of the power converter 192. By way of example, the topology resistor R2 142 may take on values in the range of 1 or 5 to 10 kOhm. A topology resistor R2 142 of a first value (e.g. 1 kOhm) may be used in conjunction with a first topology of a power converter (e.g. a boost converter) and a second value (e.g. 10 kOhm) may be used in conjunction with a second topology of the a power converter (e.g. a SEPIC converter). The shunt resistor R1 141 typically has a relatively low value (in the range of a few Ohm), in order to reduce the losses of the power converter 192.

Furthermore, the power converter 192 may comprise a high side resistor R3 303 which is coupled to the input voltage Vin of the power converter 192 and which forms a voltage divider in conjunction with the topology resistor R2 142, notably when the power switch 173 is switched off. As outlined above, the shunt resistor R1 141 typically has a relatively low value, such that the voltage at the pin 140 mainly depends on the ratio between the value of the high side resistor R3 303 and the value of the topology resistor R2 142. Assuming a constant input voltage Vin and a constant high side resistor R3 303, the voltage at the pin 140 of the controller 160 only depends on the topology resistor R2 142. A different topology resistor R2 142 (corresponding to a different power converter topology) leads to a different voltage at the pin 140 of the controller 160, wherein the different voltage at the pin 140 can be measured by the controller 160. As such, the controller 160 may determine the topology of the power converter based on the voltage at the measurement pin 140.

Alternatively or in addition, the controller 160 may comprise a current source 302 which is configured to provide a pre-determined current I1 to the measurement pin 140 via switch SW1 301. The switch SW1 301 may be closed in order to enable the detection of the topology of the power converter using the topology resistor R2 142. In particular, the switch SW1 301 may be closed at time instants when the power switch 173 is open, i.e. at time instants when the measurement pin 140 is not used for measuring the current through the power switch 173. When the switch SW1 301 is closed, the current I1 is provided to the topology resistor R2 142 (and to the shunt resistor R1 141). As a result, a voltage R2*I1 is generated, wherein this voltage can be measured at the pin 140. The level of the voltage at the pin 140 only depends on the value of the topology resistor R2 142 (assuming a constant and/or known current I1). As such, the controller 160 may determine the topology of the power converter based on the voltage at the measurement pin 140.

As such, one or more components of a power converter may be used to provide the controller 160 with information regarding the topology of the power converter which is coupled to the controller 160 and which is to be operated by the controller 160. The one or more components (e.g. resistors) may take on different values which correspond to different topologies. Once the controller 160 has determined the topology of the power converter which is connected to the controller 160, the controller 160 can select the appropriate control algorithm and/or operate the power converter as required for the determined topology.

Figure 2:
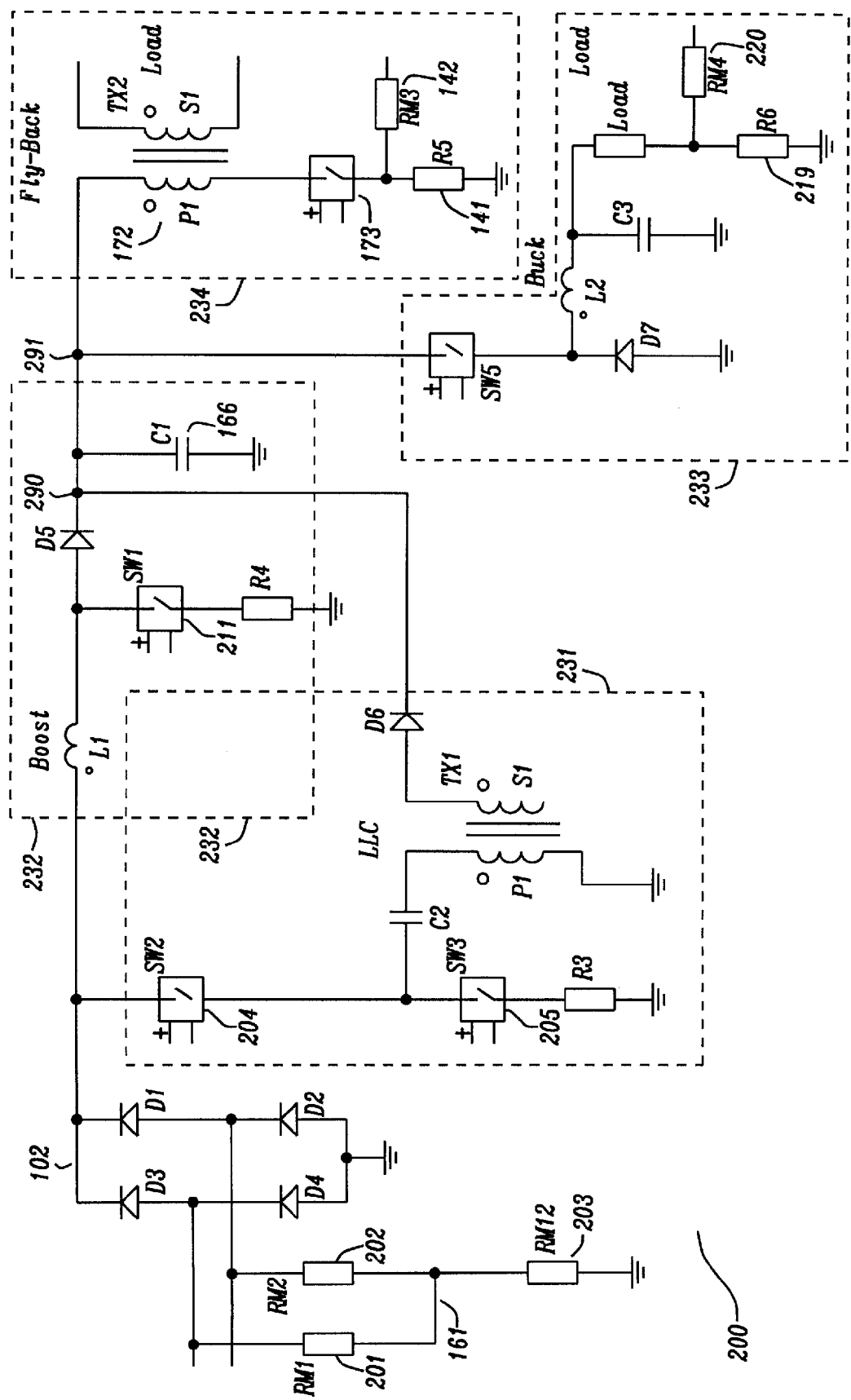
FIG. 2 shows a block diagram of example power converters.

FIG. 2 shows a block diagram of a driver circuit 200 with various different power converter topologies. The first stage of the driver circuit 200 may comprise a boost converter 232 or a LLC converter 231. The LLC converter 231 makes use of a half bridge comprising the power switches 204 and 205. As such, the controller 160 which controls the boost converter 232 or the LLC converter 231 may need to control a single power switch SW1 211 (as is the case for the boost converter 232) or two power switches SW2 204 and SW3 205 (as is the case of the LLC converter 231). By determining the topology of the power converter 231, 232 using the method described in the present document, the controller 160 may be configured to adapt its operation mode to the number of power switches which are to be controlled.

The second stage of the driver circuit 200 of FIG. 2 comprises a flyback converter 234 or a buck converter 233, which may be activated by switch SW5. The regulation loop applied by a controller 160 may differ for the flyback converter 234 and the buck converter 233, because the flyback converter 234 typically makes an indirect measurement of the load current. As such, the controller 160 may need to apply a different regulation loop, depending on the topology of the power converter (flyback converter 234 or buck converter 233). By automatically determining the topology of the power converter which is coupled to the controller 160, the controller 160 may be configured to select the appropriate regulation scheme (or regulation loop) based on the determined topology.

As outlined above, each power converter topology may have different requirements with regards to regulation and/or power switch control and/or the number of power switches which are to be controlled. By determining the topology of the power converter which is coupled to the controller 160, the controller 160 may be enabled to adapt its operation so as to automatically meet the topology-dependent requirements.

In the illustrated example, the resistors R M1 201, R M2 202, R M12 203, R M3 142, and/or R M4 220 may be used to indicate the topology of the power converter 231, 232, 233, 234 and/or of the complete driver circuit 100, 200 to the controller 160. LLC converter 231 comprises a transformer Tx1, a primary winding P1, and a secondary winding S1. Fly-back converter 234 comprises a transformer TX2 172, a primary winding P1, and a secondary winding S1. It should be understood that power converters 231, 232, 233, and 234 are non-limiting examples of a multitude of different power converters, which can have their topology indicated. The T-junctions 290 and 291 are shown as examples depending on which specific power converters are deployed actually. In particular, different values of the resistors 201, 202, 203, 142, 220 may be used to indicate a different power converter and/or driver circuit topology. These topology resistors 201, 202, 203, 142 and 220 are key of FIG. 2.

By way of example, the resistors R M1 201 and R M2 202 may take on different values, such that the signal sensed by the controller 160 differs at each half period of the mains voltage. Alternatively or in addition, the absolute value of the resistors 201, 202 may differ, which results in different measurement signals. In particular, the resistors 201, 202 may form a voltage divider in conjunction with the resistor 203. The voltage at the mid-point of the voltage device may be measured by a pin (e.g. the measurement pin 130 shown in FIG. 1) of the controller 160. The resistors 201, 202 may take on different values for different topologies of the driver circuit 200, thereby enabling the controller 160 to detect the topology of the driver circuit 200 and/or of the power converters comprised within the driver circuit 200, based on the voltage at the mid-point of the voltage divider. Typical values for the resistors 201, 202 may be 1 kOhm, 2 kOhm, 4 kOhm and/or 8 kOhm.

In a similar manner, the resistors R M3 142 and R M4 220 may be used to form voltage dividers with the resistors R5 141 and R6 219, respectively. The resistors R M3 142 or R M4 220 may vary e.g. between 1 kOhm and 10 kOhm. The internal measurement system of the controller 160 may be configured to detect a difference of about 10% between the different resistor values. Typical values for the resistor 142, 220 may be 1 kOhm, 2 kOhm, 4 kOhm and/or 8 kOhm. As such, different resistor values may be used to identify four or more different types of topologies.

The detection based on differently designed components of the external system which is controlled by the controller 160 may be used e.g. to adapt the operation of the controller 160 to different driver topologies, to adapt a regulation loop to the power converter topology, to inform the controller 160 about an inductor value of coil systems comprised in the external system and/or to inform the controller 160 about the voltage/current of a load 120 of the driver circuit 100, 200.

Figure 4:
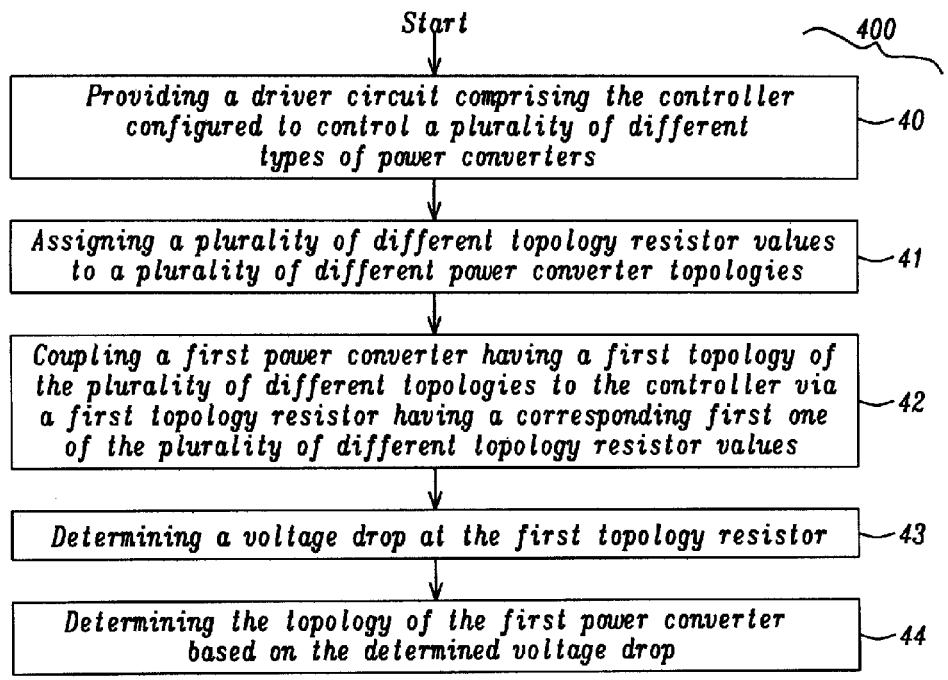
FIG. 4 shows a flowchart of an example method for detecting the topology of a power converter.

FIG. 4 shows a flowchart of an example method 400 for determining the topology of a driver circuit 100, 200 and/or of a power converter 231, 232, 233, 234. As outlined above, the driver circuits and/or the power converters are to be controlled or operated by a controller 160. The method 400 comprises in step 40 providing a driver circuit comprising the controller configured to control a plurality of different types of power converters and in step 41 assigning a plurality of different topology resistor values to a plurality of different power converter and/or driver circuit topologies. Furthermore, the method 400 comprises in step 42 coupling a first power converter and/or a first driver circuit having a first one of the plurality of different topologies to the controller 160 via a first topology resistor having the corresponding first one of the plurality of different topology resistor values. In particular, the first topology resistor may be coupled to a measurement pin 130, 140 of the controller 160. The first topology resistor may be coupled to the controller 160 such that the topology resistor forms a voltage divider with respect to a pre-determined voltage level (e.g. C). Alternatively or in addition, the first topology resistor may be coupled to the controller 160 such that the first topology resistor may be submitted to a pre-determined current generated by the controller 160. As a result, a voltage drop at the first topology resistor only depends on the value of the first topology resistor (wherein the other influential factors of the voltage drop are known to the controller 160). By consequence, the voltage drop at the first topology resistor (and the measurement pin 130, 140) directly maps to a value of the first topology resistor (and vice versa).

In step 43 the method further comprises determining the voltage drop at the first topology resistor. The voltage drop at the first topology resistor may correspond to (or may be proportional to) the voltage at the measurement pin 130, 140 of the controller 160. In addition, in step 44 the method 400 comprises determining the topology of the first power converter and/or driver circuit based on the determined voltage drop. For this purpose, the controller 160 may comprise a memory unit to store a mapping list which maps a pre-determined list of voltage values (and corresponding topology resistor values) to a pre-determined list of power converter and/or driver circuit topologies. The controller 160 may compare the measured voltage drop with the voltage values in the pre-determined list of voltage values, to determine the topology of the power converter and/or driver circuit.

With some topologies a short circuit can also do the job or if the first converter stage is missing, no time constant of the coil will measured only resistor values/shorts (pulse should be current limited). In other words, a short circuit to ground or to the supply voltage Vcc can be used as a signal to determine a particular topology of the power converter and/or the driver circuit. Alternatively or in addition, a time constant may be measured. The time constant may depend on the value of a gate capacitor of a transistor of the power converter and/or on an inductor value of an inductor comprised within the power converter. The time constant may provide an indication of the particular topology of the power converter and/or the driver circuit.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A controller configured to control a plurality of different types of power converters in accordance to a corresponding plurality of different operation modes; wherein
the controller comprises a measurement pin configured to be coupled to a first topology resistor of a first power converter of a type from the plurality of different types of power converters; wherein the plurality of different types of power converters comprise topology resistors at a corresponding plurality of different resistor values;
the controller comprises a memory unit configured to store a plurality of different pre-determined voltage values;
the plurality of different pre-determined voltage values correspond to the plurality of different types of power converters;
the controller is configured to sense a voltage at the measurement pin; wherein the voltage at the measurement pin is indicative of a voltage drop at the first topology resistor;
the controller is configured to compare the sensed voltage with the plurality of different pre-determined voltage values to determine the type of the first power converter; and
the controller is configured to select an operation mode for controlling the first power converter, based on the determined type of the first power converter.

2. The controller of claim 1, wherein
the first topology resistor is part of a voltage divider; and
a voltage across the voltage divider corresponds to a voltage level which is known to the controller.

3. The controller of claim 2, wherein a mid-point of the voltage divider is coupled to the measurement pin of the controller.

4. The controller of claim 3, wherein
the voltage divider is coupled to an AC mains supply;
the first topology resistor is coupled to a first conductor of the AC mains supply;
a second topology resistor is coupled to a different second conductor of the AC mains supply at one side, and to the mid-point of the voltage divider at the other side;
a low side resistor is coupled to the mid-point of the voltage divider and to ground, such that the first and second topology resistors, on one side of the mid-point, and the low side resistor, on the other side of the mid-point, form the voltage divider; and
at least two of the plurality of different types of power converters comprise a second topology resistor;
wherein the second topology resistors of the at least two different types of power converters have different resistor values.

5. The controller of claim 3, wherein
the voltage divider comprises a high side resistor coupled at one side to an input voltage of the first power converter, and at the other side to the mid-point of the voltage divider; and
the first topology resistor is coupled at one side to the mid-point of the voltage divider and at the other side to ground.

6. The controller of claim 3, wherein
the first power converter comprises a power switch arranged in series with a shunt resistor coupled at one side to ground;
the other side of the shunt resistor is coupled to the measurement pin via the first topology resistor;
the controller is configured to alternate the power switch between an off-state and an on-state;
the controller is configured to measure a first measurement signal at the measurement pin, when the power switch is in on-state; and a second measurement signal at the measurement pin, when the power switch is in off-state;
the first measurement signal is indicative of the current through the power switch; and
the second measurement signal is indicative of a voltage drop at the first topology resistor.

7. The controller of claim 1, wherein
the controller comprises a current source configured to provide a pre-determined current to the measurement pin; and
the voltage drop at the first topology resistor is dependent on the pre-determined current.

8. The controller of claim 7, wherein a current through the first topology resistor corresponds to the pre-determined current.

9. The controller of claim 1, wherein
the first power converter is a switched-mode power converter comprising a power switch;
the controller is configured to generate a control signal for alternating the power switch between an off-state and an on-state; and
the control signal is generated based on the type of the first power converter.

10. The controller of claim 1, wherein the operation mode depends on one or more of
a number of power switches to be controlled for a particular type of power converter; and
a regulation scheme to be used for a particular type of power converter.

11. The controller of claim 1, wherein
the controller comprises a control pin configured to be coupled to a gate of a first power switch of at least one of the plurality of different types of power converters;
the controller is configured to provide a gate current at the control pin;
the controller is configured to sense a voltage at the control pin; and
the controller is configured to determine the type of the first power converter also based on the sensed voltage at the control pin.

12. A driver circuit configured to provide electrical energy to a load; wherein the driver circuit comprises
a first power converter configured to convert electrical energy at an input voltage into electrical energy at an output voltage; wherein the first power converter is of a type from a plurality of different types of power converters; wherein the plurality of different types of power converters comprise topology resistors at a corresponding plurality of different resistor values;
a controller according to claim 1; wherein the controller is configured to determine the type of the first power converter based on the topology resistor of the first power converter and to operate the first power converter based on the determined type of the first power converter.

13. The driver circuit of claim 12 wherein the controller is pre-configured to control various different types of power converters in order to reduce the number of controller types thereby reducing the cost of driver circuits comprising the different types of power converters.

14. The driver circuit of claim 12 wherein the topology of the power converter and/or of the driver circuit is determined based on different gate capacitance values used for different power switches of different power converters and/or driver circuit topologies.

15. The driver circuit of claim 12 wherein the controller has access to configuration or topology data stored on a storage unit of the power converter or driver circuit wherein the controller is configured to compare the determined type of the first power converter with a type stored in the storage unit.

16. The driver circuit of claim 12 wherein the driver circuit is configured to provide electrical energy to a load.

17. The driver circuit of claim 16 wherein the load is an LED array.

18. A method for determining a topology of a power converter to be controlled by a controller, the method comprising:
providing a driver circuit comprising the controller configured to control a plurality of different types of power converters;
assigning a plurality of different topology resistor values to a plurality of different power converter topologies;
coupling a first power converter having a first topology of the plurality of different power converter topologies to the controller via a first topology resistor having a corresponding first one of the plurality of different topology resistor values;
providing a plurality of different pre-determined voltage values; wherein the plurality of different pre-determined voltage values correspond to the plurality of different power converters topologies;
determining a voltage drop at the first topology resistor; and
determining the topology of the first power converter based on the determined voltage drop by comparing the determined voltage drop with the plurality of different pre-determined voltage values.

19. The method of claim 18, further comprising coupling a first driver circuit having the first topology of the plurality of different topologies to the controller via the first topology resistor having the corresponding first one of the plurality of different topology resistor values.

20. The method of claim 18 further coupling the first topology resistor to a measurement pin of the controller.

21. The method of claim 20 wherein the first topology resistor is coupled to the controller such that the topology resistor forms a voltage divider with respect to a pre-determined voltage level.

22. The method of claim 21 wherein the pre-determined voltage level corresponds to an input voltage of the power converter and/or a driver circuit.

23. The method of claim 20 wherein the first topology resistor is coupled to the controller such that the first topology resistor is submitted to a pre-determined current generated by the controller.

24. The method of claim 20 wherein the voltage drop at the first topology resistor is proportional to the voltage at the measurement pin of the controller.

25. The method of claim 20 wherein the controller comprises a memory unit to store a mapping list which maps a pre-determined list of voltage values and corresponding topology resistor values to a pre-determined list of power converter and/or driver circuit topologies.

26. The method of claim 25 wherein controller comprises a measured voltage drop at the first topology resistor with the voltage values in the pre-determined list of voltage values to determine the topology of the power converter and/or driver circuit.

27. The method of claim 18 wherein a short circuit to ground or to supply voltage Vcc can be used as a signal to determine a particular topology of the power converter and/or the driver circuit.

28. The method of claim 18 wherein a time constant measured depends on the value of a gate capacitor of a transistor of the power converter and/or on an inductor value of an inductor comprised within the power converter wherein the time constant provides an indication of the particular topology of the power converter and/or the driver circuit.

* * * * *

UNITED STATES PATENT AND TRADEMARK OFFICE
CERTIFICATE OF CORRECTION

PATENT NO.        : 9,331,592 B2
APPLICATION NO.   : 14/166381
DATED             : May 3, 2016
INVENTOR(S)       : Horst Knoedgen It is certified that error appears in the above-identified patent and that said Letters Patent is hereby corrected as shown below:

On the title page, in the Assignee item (73), delete address "Kircheim/Teck-Nabern (DE)" and replace with -- Kirchheim/Teck-Nabern (DE) --.

Signed and Sealed this
Nineteenth Day of July, 2016

Michelle K. Lee
*Director of the United States Patent and Trademark Office*